(12) United States Patent
Tao et al.

(10) Patent No.: US 12,100,418 B2
(45) Date of Patent: Sep. 24, 2024

(54) DIALOGUE EMOTION CORRECTION METHOD BASED ON GRAPH NEURAL NETWORK

(71) Applicant: INSTITUTE OF AUTOMATION, CHINESE ACADEMY OF SCIENCES, Beijing (CN)

(72) Inventors: Jianhua Tao, Beijing (CN); Zheng Lian, Beijing (CN); Bin Liu, Beijing (CN); Xuefei Liu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 392 days.

(21) Appl. No.: 17/472,511

(22) Filed: Sep. 10, 2021

(65) Prior Publication Data

US 2022/0270636 A1 Aug. 25, 2022

(30) Foreign Application Priority Data

Feb. 22, 2021 (CN) .......................... 202110196514.9

(51) Int. Cl.
*G10L 25/63* (2013.01)
*G06F 18/25* (2023.01)
(Continued)

(52) U.S. Cl.
CPC ............ *G10L 25/63* (2013.01); *G06F 18/253* (2023.01); *G06F 40/166* (2020.01);
(Continued)

(58) Field of Classification Search
CPC ......... G10L 25/64; G10L 15/02; G10L 25/30; G06V 40/168; G06V 20/41; G06V 40/166; G06F 18/253
See application file for complete search history.

(56) References Cited

U.S. PATENT DOCUMENTS 10,410,630 B2    9/2019  Weng et al.
11,830,291 B2 *  11/2023 Mittal .................. G06V 10/806
(Continued)

FOREIGN PATENT DOCUMENTS

CN    108805087 A    11/2018
CN    108805088 A    11/2018
(Continued)

OTHER PUBLICATIONS

He et al., "The Character Relationship Mining Based on Knowledge Graph and Deep Learning", 5th International Conference on Big Data Computing and Communications (BIGCOM), QingDao, China, pp. 22-27 (Year: 2019).*

(Continued)

*Primary Examiner* — Hai Phan
*Assistant Examiner* — Alvin Iskender
(74) *Attorney, Agent, or Firm* — Oliff PLC

(57) ABSTRACT

Disclosed is a dialogue emotion correction method based on a graph neural network, including: extracting acoustic features, text features, and image features from a video file to fuse them into multi-modal features; obtaining an emotion prediction result of each sentence of a dialogue in the video file by using the multi-modal features; fusing the emotion prediction result of each sentence with interaction information between talkers in the video file to obtain interaction information fused emotion features; combining, on the basis of the interaction information fused emotion features, with context-dependence relationship in the dialogue to obtain time-series information fused emotion features; correcting, by using the time-series information fused emotion features, the emotion prediction result of each sentence that is obtained previously as to obtain a more accurate emotion recognition result.

3 Claims, 2 Drawing Sheets

(51) Int. Cl.
| | |
|---|---|
| *G06F 40/166* | (2020.01) |
| *G06F 40/211* | (2020.01) |
| *G06F 40/216* | (2020.01) |
| *G06F 40/284* | (2020.01) |
| *G06F 40/289* | (2020.01) |
| *G06F 40/30* | (2020.01) |
| *G06N 20/00* | (2019.01) |
| *G06N 20/20* | (2019.01) |
| *G06V 20/40* | (2022.01) |
| *G06V 40/16* | (2022.01) |
| *G10L 15/02* | (2006.01) |
| *G10L 15/26* | (2006.01) |
| *G10L 25/30* | (2013.01) |

(52) U.S. Cl.
CPC .......... *G06F 40/211* (2020.01); *G06F 40/216* (2020.01); *G06F 40/284* (2020.01); *G06F 40/289* (2020.01); *G06F 40/30* (2020.01); *G06N 20/00* (2019.01); *G06N 20/20* (2019.01); *G06V 20/41* (2022.01); *G06V 40/166* (2022.01); *G06V 40/168* (2022.01); *G10L 15/02* (2013.01); *G10L 15/26* (2013.01); *G10L 25/30* (2013.01)

(56) References Cited

U.S. PATENT DOCUMENTS

| | | | | |
|---|---|---|---|---|
| 2014/0058735 A1* | 2/2014 | Sharp | .................. | G10H 1/0008 704/500 |
| 2017/0345424 A1* | 11/2017 | Ikeno | ..................... | G06F 40/30 |
| 2019/0341025 A1* | 11/2019 | Omote | ..................... | G10L 25/30 |
| 2020/0302953 A1* | 9/2020 | Ando | ..................... | G10L 25/30 |

FOREIGN PATENT DOCUMENTS

| | | | | |
|---|---|---|---|---|
| CN | 108877801 A | | 11/2018 | |
| CN | 111164601 A | | 5/2020 | |
| CN | 112348075 A | * | 2/2021 | .......... G06K 9/6273 |

OTHER PUBLICATIONS

R. Wang and Z. Tao, "Interactive Attention Encoder Network with Local Context Features for Aspect-Level Sentiment Analysis," 2020 IEEE/CIC International Conference on Communications in China (ICCC), Chongqing, China, 2020, pp. 571-576 (Year: 2020).*

Z. Zhang and R. Zhang, "Combined Self-attention Mechanism for Biomedical Event Trigger Identification," 2019 IEEE International Conference on Bioinformatics and Biomedicine (BIBM) pp. 1009-1012, (Year: 2019).*

Huddar et al., "Attention-based multimodal contextual fusion for sentiment and emotion classification using bidirectional LSTM", Jan. 2021 (Year: 2021).*

Ho et al., "Multimodal Approach of Speech Emotion Recognition Using Multi-Level Multi-Head Fusion Attention-Based Recurrent Neural Network," IEEE Access, vol. 8, pp. 61672-61686 (Year: 2020).*

Apr. 8, 2020 Office Action issued in Chinese Patent Application No. 202110196514.9.

May 13, 2021 Notice of Allowance issued in Chinese Patent Application No. 202110196514.9.

Translation of first Chinese Search Report.
Translation of Supplementary Search Report 1.
Translation of Supplementary Search Report 2.

* cited by examiner

DIALOGUE EMOTION CORRECTION METHOD BASED ON GRAPH NEURAL NETWORK

CROSS-REFERENCE TO RELATED APPLICATION

The present disclosure claims the priority to Chinese Patent Application CN202110196514.9 entitled "Dialog emotion correction method based on graph neural network" filed on Feb. 22, 2021, the entire content of which is incorporated herein by reference.

FIELD OF THE INVENTION

This disclosure relates to the field of emotion recognition, and in particular to a dialog emotion correction method based on a graph neural network.

BACKGROUND OF THE INVENTION

Dialogue scene-oriented emotion recognition technology not only has great scientific significance, but also has great economic value and a wide range of application prospects. Further, its application scenarios are not limited to the field of human-computer interaction, but also can play an important role in many other fields, such as dialogue generation, social media analysis and intelligent systems.

The dialogue scene-oriented emotion recognition technology aims to comprehend the way that humans express emotions in dialogue scenes and to identify an emotional state contained in each sentence of a dialogue. There are two crucial pieces of information in a dialogue scene, i.e., time series information and interaction information. The time series information contains a wealth of background knowledge, which is often helpful to understand an emotional state of the current moment. Interaction information refers to that the emotional state of the current moment would be affected by emotions of a talker with whom it is talking. For example, in the case that the talker is extremely angry, an audience is often affected by the talker's emotional state at the moment and becomes very angry too. This phenomenon is referred to as "empathy" in the field of psychology.

At present, mainstream of researches are concentrating on single sentence-based emotion recognition models. However, these single sentence-based emotion recognition models rely only on a current sentence to recognize an emotional state without taking account of the time series information and the interaction information in a dialogue scene. As such, it is quite challenging that how can these single sentence-based emotion recognition models be modified into such emotion recognition systems that are applicable to dialogue scenes.

Patent No. CN108877801B discloses a multi-round dialogue semantic comprehension subsystem based on a multi-modal emotion identification system. The system comprises a data collection device and an output device. The system further comprises an emotion analysis software system which performs comprehensive analysis and inference of data obtained through the data collection device and finally outputs a result to the output device; and the emotion analysis software system includes said multi-round dialogue semantic comprehension subsystem. This solution employs a deep neural network to perform comprehensive determination on information of multiple single modals through encoding of the neural network and deep association and comprehending, which improves accuracy thereof and is suitable for most of inquiry interaction application scenes.

Patent Application Publication No. CN111164601A discloses an emotion recognition method including: obtaining a group of multi-modal data to be recognized which includes at least two of video data, audio data, and/or text data; extracting a video semantic feature sequence from the video data, an audio semantic feature sequence from the audio data, and/or a text semantic feature sequence from the text data; aligning the text semantic feature sequence to time dimension of the audio data to generate a text semantic time-series sequence; fusing, according to the time dimension, the video semantic feature sequence, the audio semantic feature sequence and/or the text semantic time-series sequence to generate a multi-modal semantic feature sequence; inputting the multi-modal semantic feature sequence into a pre-trained emotion recognition neural network, and taking an output result of the emotion recognition neural network as a target emotion of the group of data to be recognized. This solution effectively improves accuracy of emotion recognition.

SUMMARY OF THE INVENTION

In a first aspect, the present disclosure provides a dialogue emotion correction method based on a graph neural network, including steps of: feature extraction step, emotion recognition step, interaction modeling step, time-series modeling step, and emotion correction step.

The feature extraction step is configured to extract acoustic features, text features, and image features in a video file, and fuse the acoustic features, the text features and the image features in the video file into multi-modal features.

The emotion recognition step is configured to obtaining an emotion prediction result of each sentence of a dialogue in the video file by using the multi-modal features.

The interaction modeling step is configured to fuse the emotion prediction result of each sentence with interaction information between talkers in the dialogue to obtain interaction information fused emotion features.

The time-series modeling step is configured to combine the interaction information fused emotion features with context-dependence relationship in the dialogue to obtain time-series information fused emotion features.

The emotion correction step is configured to correct, by using the time-series information fused emotion features, the emotion prediction result of each sentence obtained in the multi-modal features-base emotion recognition step so as to obtain a more accurate emotion recognition result.

In some embodiments, the feature extraction step includes the following sub-steps: acoustic feature extraction sub-step, text feature extraction sub-step, image feature extraction sub-step, and multi-modal feature fusion sub-step.

The acoustic feature extraction sub-step is configured to divide a voice in the video file into voice frames, extract an acoustic feature parameter of each voice frame, and calculate statistical information of acoustic feature parameters of all voice frames so as to obtain sentence-level acoustic features, wherein the acoustic feature parameters include at least one of prosodic feature, sound quality feature and spectral feature.

The text feature extraction sub-step is configured to convert each word in the video file to a corresponding word vector feature, and calculate statistical information of all word vector features so as to obtain sentence-level text features.

The image feature extraction sub-step is configured to divide a video in the video file into several image frames, detect a location of face area from each of the image frames and extract a shape feature and an appearance feature based on the location of the face area, and calculate statistical information of shape features and appearance features of all image frames so as to obtain final image features.

The multi-modal feature fusion sub-step is configured to splice the acoustic features, the text features, and the image features to obtain multi-modal features.

In some embodiments, the emotion recognition step may use any emotion recognition method, such as Support Vector Machine, Random Forest, or Deep Neural Network, to obtain the emotion prediction result of each sentence according to the multi-modal features.

In some embodiments, the interaction modeling step adopts a graph neural network to fuse the emotion prediction result of each sentence with the interaction information so as to obtain the interaction information fused emotion features.

The graph neural network is mainly composed of three parts: nodes, edges and edge types.

Each sentence $u_j (j=1, \ldots, N)$ is taken as a node in the graph neural network, and initial features of the node are represented by the emotion prediction result $h_j^{(0)}$ $(j=1, \ldots, N)$ of each sentence obtained by the emotion recognition step, wherein N is the number of sentences in a dialogue, and $u_j$ represents the j-th sentence in the dialogue.

At the meanwhile, fusion with the interaction information in the dialogue is performed during modeling through the graph neural network. The interaction information includes self-dependence and inter-dependence of persons who are talking in the dialogue. The self-dependence refers to that an emotional state at the current moment of each person in the dialogue suffers from impact from an emotional state at the previous moment of himself/herself, and the inter-dependence refers to that an emotional state at the current moment of each person in the dialogue is affected by a talker with whom the person is talking.

In some embodiments, the graph neural network model uses two types of edges to describe the self-dependence and the interdependence, respectively, wherein a connection between a person A's sentence node of the current moment and A's sentence node of the previous moment is used as an edge for representation of A's self-dependence; an connection between A's sentence node of the current moment and a person B's sentence node of the previous moment is used as an edge for representation of inter-dependence between A and B, said A and B representing two persons in the dialogue.

In some embodiments, two gating mechanisms, i.e., reset gate $f_j^{(t)} \in \mathbb{R}^{1 \times C}$ and update gate $z_j^{(t)} \in \mathbb{R}^{1 \times C}$ may be used to fuse integrated information $a_j^{(t)}$ with information $h_j^{(t-1)}$ of the previous moment so as to obtain a new feature parameter $h_j^{(t)} \in \mathbb{R}^{1 \times C}$, wherein formulas for calculation are, respectively, $$f_j^{(t)} = \sigma(a_j^{(t)} W_f + h_j^{(t-1)} U_f)$$

$$z_j^{(t)} = \sigma(a_j^{(t)} W_z + h_j^{(t-1)} U_z)$$

$$\hat{h}_j^{(t)} = \tanh(a_j^{(t)} W + (f_j^{(t)} \odot h_j^{(t-1)}) U)$$

$$h_j^{(t)} = (1 - z_j^{(t)}) \odot h_j^{(t-1)} + z_j^{(t)} \odot \hat{h}_j^{(t)}$$

where $W_f \in \mathbb{R}^{|R| C \times C}$, $W_z \in \mathbb{R}^{|R| C \times C}$, $W \in \mathbb{R}^{|R| C \times C}$, $U_f \in \mathbb{R}^{C \times C}$, $U_z \in \mathbb{R}^{C \times C}$, and $U \in \mathbb{R}^{C \times C}$ are training parameters, and $\odot$ refers to element-wise dot product; and where $a_j^{(t)}$ is a result of integrating information of different nodes in terms of the edge types, that is, $$a_j^{(t)} = \underset{r \in R}{\mathrm{Concat}} \left[ \sum_{i \in S_j^r} w_{ij} h_i^{(t-1)} W_r \right]$$

where R is a set of the edge types, $S_j^r$ is a set of nodes connected to a node j under a relationship $r \in R$, $w_{ij}$ is a weight of an edge between a node i and the node j, $h_i^{(t-1)}$ is features of the node i during the (t−1)-th iteration, and $W_r \in \mathbb{R}^{C \times C}$ is a weight parameter corresponding to the relationship r; and wherein |R| is the number of edge types.

In some embodiments, the time-series modeling step includes the following sub-steps: feature augmentation sub-step, bidirectional recurrent neural network sub-step, and self-attention mechanism sub-step.

The feature augmentation sub-step is configured to splice the initial features $h_j^{(0)}$ $(j=1, \ldots, N)$ of the interaction modeling step of the node $u_j$ $(j=1, \ldots, N)$ with output features $h_j^{(T)}$ $(j=1, \ldots, N)$ of the interaction modeling step to form augmented features $l_j$ $(j=1, \ldots, N)$.

The bidirectional recurrent neural network sub-step is configured to input the augmented features $l_j$ $(j=1, \ldots, N)$ into a bidirectional recurrent neural network to fuse the augmented features with the context information so as to obtain context information features $q_j$ $(j=1, \ldots, N)$.

The self-attention mechanism sub-step is configured to perform value assignment, by using the context information features $q_j$ $(j=1, \ldots, N)$, to Query Q, Key K and Value V of a self-attention mechanism, and then perform linear transformations on the value-assigned Query Q, Key K and Value V by $m$ times to obtain Query $Q_i$, Key $K_i$ and Value $V_i$ under a subspace, wherein $i \in [1, m]$.

Calculation is carried out based on self-attention mechanism fused features $head_i$, $i \in [1, m]$, a specific calculation formula of which is, $$head_i = \mathrm{softmax}(Q_i K_i^T) V_i$$

$head_i$, $i \in [1, m]$ are spliced to obtain output features $r_j$ $(j=1, \ldots, N)$ of the self-attention mechanism sub-step, wherein the output features of the self-attention mechanism sub-step are exactly output features of the time-series modeling step, i.e., the time-series information fused emotion features, and wherein N represents the number of sentences in the dialogue, and $r_j$ represents time-series information fused emotion features of the j-th sentence in the dialogue.

In some embodiments, the emotion correction step is configured to use, based on the output features $r_j$ $(j=1, \ldots, N)$ obtained in the time-series modeling step, a single-layer perceptron to obtain a new emotion prediction result, and use the new emotion prediction result as a corrected result of the emotion prediction result of each sentence in the multi-modal features-based emotion recognition step, wherein a formula of the single-layer perceptron is, $$P_j = \mathrm{softmax}(r_j W_p + b_p).$$

where $W_p$ and $b_p$ are parameters of the single-layer perceptron.

In a second aspect, the present disclosure further provides a computer-readable storage medium storing a computer program thereon, characterized in that, the computer program, when being executed by a processor, implements the dialogue emotion correction method based on a graph neural network as described above.

In a third aspect, the present disclosure further provides a terminal device including a memory and a processor, wherein a computer program is stored on the memory, characterized in that, the computer program, when being executed by the processor, implements the dialogue emotion correction method based on a graph neural network as described above.

The foregoing provided by the embodiments of the present disclosure has the following advantages.

According to the method provided by the embodiments of the present disclosure, (1) a dialogue emotion correction method based on a graph neural network is proposed for the first time, in which an emotion recognition result based on multi-modal features is corrected through introduction of the interaction information and the time series information so that the accuracy of emotion recognition can be improved.

(2) Inter-dependence relationship between talkers is fused through the graph neural network so that an emotion correction effect can be enhanced.

(3) Context-dependence relationship in a dialogue is fused through a recurrent neural network and a self-attention mechanism so that an emotion correction effect can be enhanced.

BRIEF DESCRIPTION OF THE DRAWINGS

The drawings here are incorporated into the specification and constitute a part of the specification, which illustrate embodiments in accordance with the present disclosure and is applicable to explain the principle of the present disclosure together with the specification.

In order to more clearly describe the technical solutions in the embodiments of the present disclosure or the existing solutions in the art, accompanying drawings needed in the description of the embodiments or the existing solutions will be briefly introduced below. Apparently, for those of ordinary skill in the art, other drawings can be obtained based on these drawings without any inventive labor involved.

In the figures: 1—feature extraction step, 2—emotion recognition step, 3—interaction modeling step, 4—time-series modeling step, 5—emotion correction step, 11—acoustic feature extraction sub-step, 12—text feature extraction sub-step, 13—image feature extraction sub-step, 14—multi-modal feature fusion sub-step, 41—feature augmentation sub-step, 42—bidirectional recurrent neural network sub-step, 43—self-attention mechanism sub-step.

DETAILED DESCRIPTION OF THE EMBODIMENTS

In order to make purposes, technical solutions and advantages of the embodiments of the present disclosure more definite, the technical solutions of the embodiments of the present disclosure will be described clearly and completely below in conjunction with accompanying drawings. Apparently, the embodiments described herein merely constitute a portion, rather than the whole, of the embodiments of the present disclosure. On the basis of the embodiments of the present disclosure, all other embodiments obtained by those of ordinary skill without any inventive labor involved should fall within the protection scope of the present disclosure.

Figure 1:
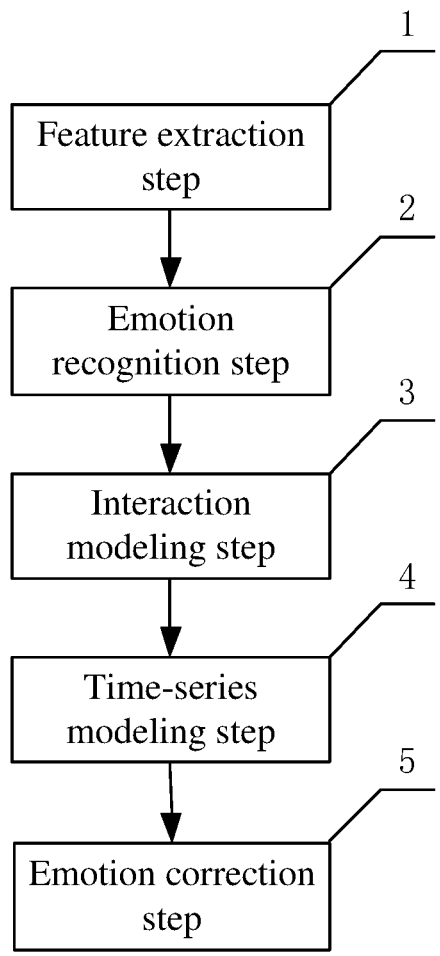
FIG. 1 is a flow chart of a dialog emotion correction method based on a graph neural network according to an embodiment of the present disclosure.

FIG. 1 is a dialog emotion correction method based on a graph neural network provided by an embodiment of the present disclosure, including: feature extraction step 1, emotion recognition step 2, interaction modeling step 3, time-series modeling step 4, and emotion correction step 5.

The feature extraction step 1 is configured to extract acoustic features, text features, and image features in a video file, and fuse the acoustic features, the text features and the image features in the video file to obtain multi-modal features.

Figure 2:
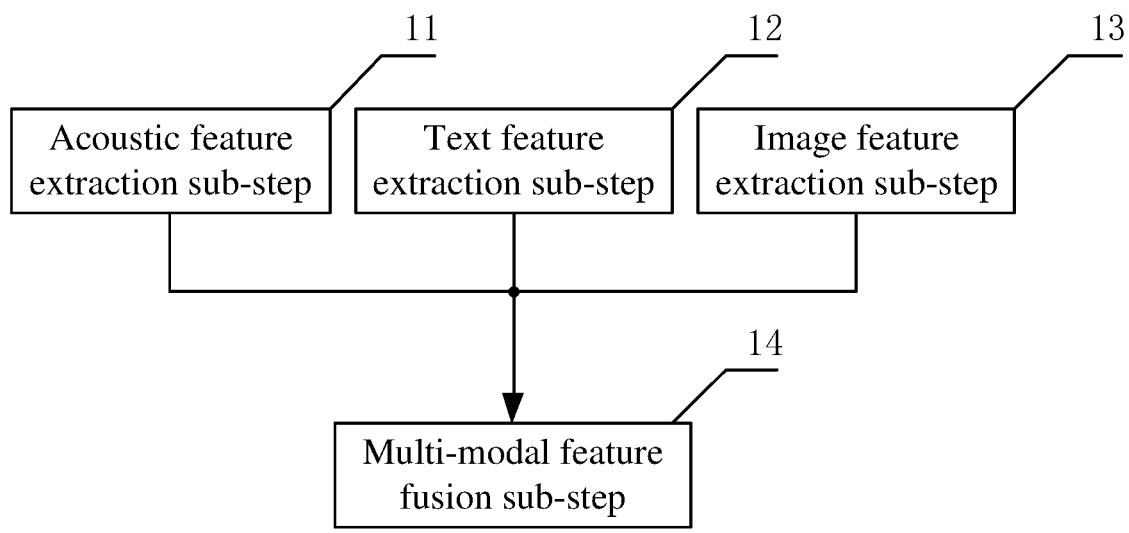
FIG. 2 is a flowchart showing steps of feature extraction according to an exemplary embodiment of the present disclosure.

As shown in FIG. 2, the feature extraction step 1 includes the following sub-steps: acoustic feature extraction sub-step 11, text feature extraction sub-step 12, image feature extraction sub-step 13, and multi-modal feature fusion sub-step 14.

The acoustic feature extraction sub-step 11 is configured to divide a voice in the video file into voice frames, extract an acoustic feature parameter of each voice frame, and calculate statistical information of acoustic feature parameters of all voice frames so as to obtain sentence-level acoustic features. In this case, the acoustic feature parameters include at least one of prosodic feature, sound quality feature and spectral feature.

The text feature extraction sub-step 12 is configured to convert each word in the video file to a corresponding word vector feature, and calculate statistical information of all word vector features so as to obtain sentence-level text features.

The image feature extraction sub-step 13 is configured to divide the video into several image frames, detect a location of face area from each of the image frames and extract a shape feature and an appearance feature based on the location of the face area, and calculate statistical information of shape features and appearance features of all image frames so as to obtain final image features.

The multi-modal feature fusion sub-step 14 is configured to splice the acoustic features, the text features and the image features into multi-modal features.

The multi-modal features-based emotion recognition step 2 is configured to obtain an emotion prediction result with respect to each sentence. For example, the multi-modal features-based emotion recognition step 2 may adopt any emotion recognition method like Support Vector Machine, Random Forest or Deep Neutral Network to obtain the emotion prediction result of each sentence according to the multi-modal features.

The interaction modeling step 3 is configured to fuse the emotion prediction result of each sentence with interaction information in a dialogue to obtain interaction information fused emotion features. In this case, the interaction information reflects self-dependence and inter-dependence of persons who are taking in the dialogue.

The interaction modeling step 3 adopts a graph neural network for modeling. The graph neural network is composed of three parts, i.e., nodes, edges and edge types.

Each sentence $u_j$ (j=1, ..., N) is taken as a node in the graph neural network, that is, a node represents a sentence in a dialogue. In this case, each node is also called a sentence node, where N is the number of sentences in the dialogue, and $u_j$ is the j-th sentence in the dialogue. Initial features of a node are represented by the emotion prediction result $h_j^{(0)}$ (j=1, ..., N) of the multi-modal features-based emotion recognition step 2.

At the meanwhile, the interaction information in the dialogue is fused during the modeling through the graph neural network. The interaction information reflects self-dependence and inter-dependence of persons who are talking in the dialogue. The self-dependence refers to that an emotional state at the current moment of each person in the dialogue suffers from impact from an emotional state at the previous moment of himself/herself, and the inter-dependence refers to that an emotional state at the current moment of each person in the dialogue is affected by another person with whom he/her is talking.

In view of these, the graph neural network uses two types of edge to describe the self-dependence and the inter-dependence, respectively. Specifically, a connection between a person A's sentence node of the current moment and A's sentence node of the previous moment is used as an edge for representation of A's self-dependence; an connection between A's sentence node of the current moment and a person B's sentence node of the previous moment is used as an edge for representation of inter-dependence between A and B, said A and B representing two persons in the dialogue.

In application, two gating mechanisms may be used, i.e., reset gate $f_j^{(t)} \in \mathbb{R}^{1 \times C}$ and update gate $z_j^{(t)} \in \mathbb{R}^{1 \times C}$ to fuse integrated information $a_j^{(t)}$ with information $h_j^{(t-1)}$ of the previous moment so as to obtain a new feature parameter $h_j^{(t)} \in \mathbb{R}^{1 \times C}$. Formulas for calculation are, respectively, $$f_j^{(t)} = \sigma(a_j^{(t)} W_f + h_j^{(t-1)} U_f)$$

$$z_j^{(t)} = \sigma(a_j^{(t)} W_z + h_j^{(t-1)} U_z)$$

$$\hat{h}_j^{(t)} = \tanh(a_j^{(t)} W + (f_j^{(t)} \odot h_j^{(t-1)}) U)$$

$$h_j^{(t)} = (1 - z_j^{(t)}) \odot h_j^{(t-1)} + z_z^{(t)} \odot \hat{h}_j^{(t)}$$

where $W_f \in \mathbb{R}^{|R|C \times C}$, $W_z \in \mathbb{R}^{|R|C \times C}$, $W \in \mathbb{R}^{|R|C \times C}$, $U_f \in \mathbb{R}^{C \times C}$, $U_z \in \mathbb{R}^{C \times C}$, and $U \in \mathbb{R}^{C \times C}$ are training parameters, and $\odot$ refers to element-wise dot product; and where $a_j^{(t)}$ is a result of integrating information of different nodes in terms of the edge types, and a formula thereof is, $$a_j^{(t)} = \underset{r \in R}{\mathrm{Concat}} \left[ \sum_{i \in S_j^r} w_{ij} h_i^{(t-1)} W_r \right]$$

where R is a set of the edge types, $S_j^r$ is a set of nodes connected to a node j under a relationship $r \in R$, $w_{ij}$ is a weight of an edge between a node i and the node j, $h_i^{(t-1)}$ is features of the node i during the (t−1)-th iteration, and $W_r \in \mathbb{R}^{C \times C}$ is a weight parameter corresponding to the relationship r; and where |R| is the number of edge types.

The time-series modeling step 4 is configured to combine, on the basis of the interaction information fused emotion features, with context-dependence relationship in the dialogue to dynamically focus on relatively important context information in the dialogue so as to obtain time-series information fused emotion features.

Figure 3:
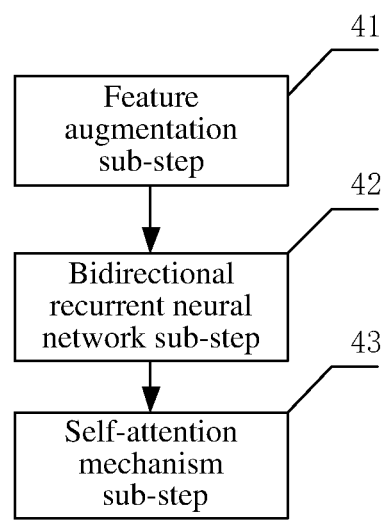
FIG. 3 is a flow chart showing steps of time-series modeling according to an exemplary embodiment of the present disclosure.

As shown in FIG. 3, the time-series modeling step 4 includes feature augmentation sub-step 41, bidirectional recurrent neural network sub-step 42, and self-attention mechanism sub-step 43.

The feature augmentation sub-step 41 is configured to splice the initial features $h_j^{(0)}$ (j=1, . . . , N) of the interaction modeling step of the node $u_j$ (j=1, . . . , N) with output features $h_j^{(T)}$ (j=1, . . . , N) of the interaction modeling step to form augmented features $l_j$ (j=1, . . . , N).

The bidirectional recurrent neural network sub-step 42 is configured to input the augmented features $l_j$ (j=1, . . . , N) into a bidirectional recurrent neural network to fuse them with the context information so as to obtain context information features $q_j$ (j=1, . . . , N).

The self-attention mechanism sub-step 43 is configured to perform value assignment, by using the context information features $q_j$ (j=1, . . . , N), to Query Q, Key K and Value V of a self-attention mechanism, and then perform linear transformations on the value-assigned Query Q, Key K and Value V by m times to obtain Query $Q_i$, Key $K_i$ and Value $V_i$ under a subspace, where $i \in [1, m]$.

Calculation is carried out based on self-attention mechanism fused features $\mathrm{head}_i$, $i \in [1, m]$, and a specific calculation formula is, $$\mathrm{head}_i = \mathrm{softmax}(Q_i K_i^T) V_i,$$

$\mathrm{head}_i$, $i \in [1, m]$ are spliced to obtain output features) $r_j$ (j=1, . . . , N) of the self-attention mechanism sub-step. The output features of the self-attention mechanism sub-step are exactly output features of the time-series modeling step, i.e., time-series information fused emotion features. In this case, $r_j$ represents time-series information fused emotion features of the j-th sentence in the dialogue, and N represents the number of sentences in the dialogue.

The emotion correction step 5 is configured to predict an emotional state of an individual in the video file.

In application, the emotion correction step 5 may adopt a single-layer perceptron to predict the emotional state of the individual in the video file. A specific formula of the single-layer perceptron is, $$P_j = \mathrm{softmax}(r_j W_p + b_p).$$

where $W_p$ and $b_p$ are parameters of the single-layer perceptron.

Finally, an emotion recognition result obtained through the above method may be measured using, for example, accuracy, recall rate, and F1 scores to determine correlation between the predicted emotional state and a true emotional state.

In addition, in a second aspect, the present disclosure further provides a computer-readable storage medium storing a computer program thereon, characterized in that, the computer program, when being executed by a processor, implements the dialogue emotion correction method based on a graph neural network as described above.

In addition, in a third aspect, the present disclosure further provides a terminal device including a memory and a processor, wherein a computer program is stored on the memory, characterized in that, the computer program, when being executed by the processor, implements the dialogue emotion correction method based on a graph neural network as described above.

It should be noted that, in this document, relational terms such as "first" and "second" are merely used to distinguish one entity or operation from another entity or operation, and do not intent to require or imply any such actual relationship or sequence between these entities or operations. Moreover, wordings "include", "comprise" or any other variants thereof are intended to cover non-exclusive inclusion, so that a process, method, article or device including a series of elements not only includes those elements, but also include other elements that have not been listed definitely or elements inherent to the process, method, article, or device. Except that there is further limitation, an element defined by the wordings, such as "include a . . . " does not exclude existence of other identical elements included in the process, method, article, or device including said element.

These above are only specific embodiments of the present disclosure to facilitate understanding or implementation of the present disclosure by those skilled in the art. Various modifications to these embodiments will be apparent to those skilled in the art, and the general principles defined herein can be implemented in other embodiments without departing from the spirit or scope of the present disclosure. Therefore, the present disclosure will not be limited to the embodiments illustrated in this document, but should conform to the broadest scope consistent with the principles and novel features provided in this document.

What is claimed is:

1. A dialogue emotion correction method based on a graph neural network, characterized in that, the method comprises:
feature extraction step, configured to extract acoustic features, text features and image features from a video file, and fuse the acoustic features, the text features and the image features in the video file into multi-modal features;
emotion recognition step, configured to obtain an emotion prediction result of each sentence of a dialogue in the video file according to the multi-modal features;
interaction modeling step, configured to fuse the emotion prediction result of each sentence with interaction information between talkers in the video file to obtain interaction information fused emotion features;
time-series modeling step, configured to combine the interaction information fused emotion features with context-dependence relationship in the dialogue to obtain time-series information fused emotion features; and
emotion correction step, configured to correct, by using the time-series information fused emotion features, the emotion prediction result of each sentence obtained by the emotion recognition step so as to obtain a more accurate emotion recognition result,
wherein the interaction modeling step uses a graph neural network for modeling, and the graph neural network is composed of three parts: nodes, edges and edge types;
wherein each sentence $u_j(j=1, \ldots, N)$ is taken as a node in the graph neural network, and initial features of the node are represented by the emotion prediction result $h_j^{(0)}(j=1, \ldots, N)$ of each sentence obtained by the emotion recognition step, wherein N represents a quantity of sentences in the dialogue;
wherein to fuse with the interaction information in the dialogue is performed during the modeling through the graph neural network, and the interaction information comprises self-dependence and inter-dependence of persons who are talking in the dialogue; the self-dependence refers to that an emotional state at a current moment of each person in the dialogue suffers from impact from an emotional state at a previous moment of himself/herself, and the inter-dependence refers to that an emotional state at a current moment of each person in the dialogue is affected by a talker with whom the person is talking;
wherein the graph neural network uses two types of edges to describe the self-dependence and the interdependence, respectively, and wherein A and B represent two persons in a dialogue, a connection between a person A's sentence node of a current moment and A's sentence node of a previous moment is used as an edge for representation of A's self-dependence, and an connection between A's sentence node of the current moment and a person B's sentence node of a previous moment is used as an edge for representation of inter-dependence between A and B;
wherein two gating mechanisms, which are reset gate $f_j^{(t)} \in \mathbb{R}^{1 \times C}$ and update gate $z_j^{(t)} \in \mathbb{R}^{1 \times C}$, are used to fuse integrated information $a_j^{(t)}$ with information $h_j^{(t-1)}$ of the previous moment so as to obtain a new feature parameter $h_j^{(t)} \in \mathbb{R}^{1 \times C}$, wherein formulas for calculation are, respectively, $$f_j^{(t)} = \sigma(a_j^{(t)} W_f + h_j^{(t-1)} U_f)$$

$$z_j^{(t)} = \sigma(a_j^{(t)} W_z + h_j^{(t-1)} U_z)$$

$$\hat{h}_j^{(t)} \tan h(a_j^{(t)} W + (f_j^{(t)} \odot h_j^{(t-1)}) U)$$

$$h_j^{(t)} = (1 - z_j^{(t)}) \odot h_j^{(t-1)} + z_j^{(t)} \odot \hat{h}_j^{(t)},$$

wherein $W_f \in \mathbb{R}^{|R|C \times C}$, $W_z \in \mathbb{R}^{|R|C \times C}$, $W \in \mathbb{R}^{|R|C \times C}$, $U_f \in \mathbb{R}^{C \times C}$, $U_z \in \mathbb{R}^{C \times C}$, and $U \in \mathbb{R}^{C \times C}$ are training parameters, and $\odot$ refers to element-wise dot product; and
wherein $a_j^{(t)}$ is a result of integrating information of different nodes in terms of the edge types, that is, $$a_j^{(t)} = \underset{r \in R}{\text{Concat}}\left[\sum_{i \in S_j^r} w_{ij} h_i^{(t-1)} W_r\right].$$

where R is a set of the edge types, $S_j^r$ is a set of nodes connected to a node j under a relationship $r \in R$, $w_{ij}$ is a weight of an edge between a node i and the node j, $h_i^{(t-1)}$ is features of the node i during the (t−1)-th iteration, and $W_r \in \mathbb{R}^{C \times C}$ is a weight parameter corresponding to the relationship r; and wherein |R| is the number of edge types,
wherein the feature extraction step comprises:
acoustic feature extraction sub-step, text feature extraction sub-step, image feature extraction sub-step and multi-modal feature fusion sub-step,
wherein the acoustic feature extraction sub-step is configured to divide a voice in the video file into voice frames, extract an acoustic feature parameter of each voice frame, and calculate statistical information of acoustic feature parameters of all voice frames so as to obtain sentence-level acoustic features, wherein the acoustic feature parameters include at least one of prosodic feature, sound quality feature and spectral feature;
wherein the text feature extraction sub-step is configured to convert each word in the video file to a corresponding word vector feature, and calculate statistical information of all word vector features so as to obtain sentence-level text features;
wherein the image feature extraction sub-step is configured to divide a video in the video file into several image frames, detect a location of face area from each of the image frames and extract a shape feature and an appearance feature based on the location of the face area, and calculate statistical information of shape features and appearance features of all image frames so as to obtain final image features;
wherein the multi-modal feature fusion sub-step is configured to splice the acoustic features, the text features, and the image features to obtain multi-modal features;
wherein in the emotion recognition step, Support Vector Machine, Random Forest, or Deep Neutral Network is used to obtain the emotion prediction result of each sentence according to the multi-modal features;
wherein the time-series modeling step comprises: feature augmentation sub-step, bidirectional cyclic neural network sub-step, and self-attention mechanism sub-step step, wherein the feature augmentation sub-step is configured to splice the initial features $h_j^{(0)}$ (j=1, ..., N) of the interaction modeling step of the node $u_j$ (j=1, ..., N) with output features $h_j^{(T)}$ (j=1, ..., N) of the interaction modeling step to form augmented features $l_j$ (j=1, ..., N);

wherein the bidirectional recurrent neural network sub-step is configured to input the augmented features $l_j$ (j=1, ..., N) into a bidirectional recurrent neural network to fuse the augmented features with context information so as to obtain context information features $q_j$ (j=1, ..., N);

wherein the self-attention mechanism sub-step is configured to perform value assignment, by using the context information features $q_j$(j=1, ..., N), to Query Q, Key K and Value V of a self-attention mechanism, and then perform linear transformations on the value-assigned Query Q, Key K and Value V by m times to obtain Query $Q_i$, Key $K_i$ and Value $V_i$ under a subspace, wherein i∈[1,m]; wherein calculation is carried out based on self-attention mechanism fused features $head_i$, i∈[1,m], a specific calculation formula of which is, $$head_i = \text{softmax}(Q_i K_i^T) V_i,$$

wherein $head_i$, i∈[1,m] are spliced to obtain output features $r_j$(j=1, ..., N) of the self-attention mechanism sub-step, which is taken as the time-series information fused emotion features, wherein in the emotion correction step, based on the time-series information fused emotion features, a single-layer perceptron is used to obtain a new emotion prediction result which is taken as a corrected result for the emotion prediction result of each sentence in the emotion recognition step, and wherein based on the time-series information fused emotion features, the new emotion prediction result is obtained by using the single-layer perceptron according to the following formula, $$P_j = \text{softmax}(r_j W_p + b_p)$$

wherein $W_p$ and $b_p$ are parameters of the single-layer perceptron, and $r_j$ represents the time-series information fused emotion features.

2. A non-transitory computer-readable storage medium storing a computer program thereon, characterized in that, the computer program, when being executed by a processor, implements the dialogue emotion correction method based on a graph neural network according to claim 1.

3. A terminal device comprising a memory and a processor, wherein a computer program is stored on the memory, characterized in that, the computer program, when being executed by the processor, implements the dialogue emotion correction method based on a graph neural network according to claim 1.

* * * * *